United States Patent
Pei et al.

(10) Patent No.: US 12,111,650 B2
(45) Date of Patent: Oct. 8, 2024

(54) SYSTEM AND METHOD FOR COORDINATING OPERATION CONTROL AND OPERATION MAINTENANCE FOR URBAN RAIL TRANSIT

(71) Applicant: CASCO SIGNAL LTD., Shanghai (CN)

(72) Inventors: Jiafu Pei, Shanghai (CN); Enhua Hu, Shanghai (CN); Li Lin, Shanghai (CN); Bingfeng Zhang, Shanghai (CN); Xiangping Zhu, Shanghai (CN); Ning Zheng, Shanghai (CN); Shuanglei Yang, Shanghai (CN); Jiafeng Guo, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 407 days.

(21) Appl. No.: 17/596,017

(22) PCT Filed: Oct. 19, 2020

(86) PCT No.: PCT/CN2020/121813
§ 371 (c)(1),
(2) Date: Dec. 1, 2021

(87) PCT Pub. No.: WO2021/135514
PCT Pub. Date: Jul. 8, 2021

(65) Prior Publication Data
US 2022/0317673 A1    Oct. 6, 2022

(30) Foreign Application Priority Data
Dec. 30, 2019   (CN) .......................... 201911395265.5

(51) Int. Cl.
*G05B 23/02*     (2006.01)
*G06Q 10/0637*   (2023.01)
(Continued)

(52) U.S. Cl.
CPC ..... *G05B 23/0275* (2013.01); *G06Q 10/0637* (2013.01); *G06Q 10/20* (2013.01); *G06Q 50/26* (2013.01)

(58) Field of Classification Search
CPC .......... G05B 23/0275; G06Q 10/0637; G06Q 10/20; G06Q 50/26; G06Q 10/063;
(Continued)

(56) References Cited

U.S. PATENT DOCUMENTS

| 2011/0072506 A1* | 3/2011 | Law ................... H04L 63/1416 726/11 |
| 2018/0208175 A1* | 7/2018 | Zhang .................. B60W 10/06 |

(Continued)

FOREIGN PATENT DOCUMENTS

| CN | 103888287 A | 6/2014 |
| CN | 105991153 A | 10/2016 |

(Continued)

OTHER PUBLICATIONS

International Search Report and Written Opinion, International Patent Application No. PCT/CN2020/121813, Jan. 18, 2021, with English translation of Search Report (10 pages).

*Primary Examiner* — Alicia M. Choi
(74) *Attorney, Agent, or Firm* — HSML P. C.

(57) ABSTRACT

The present invention relates to a system for coordinating operation control and operation maintenance for an urban rail transit and a method using the same, where the system includes: an intelligent operation maintenance subsystem and an intelligent operation control subsystem, the intelligent operation maintenance subsystem and the intelligent operation control subsystem include coordination linkage engine modules respectively, and the intelligent operation maintenance subsystem synchronizes, by using the coordination linkage engine modules, a fault handling plan to the intelligent operation control subsystem. Compared with the prior art, the present invention has the advantages of scientific and reasonable dispatching decision-making, high efficiency and high intelligence.

7 Claims, 2 Drawing Sheets

(51) Int. Cl.
*G06Q 10/20* (2023.01)
*G06Q 50/26* (2012.01)

(58) Field of Classification Search
CPC .... G06Q 50/40; G06Q 10/0631; G06Q 10/06; G06Q 10/04; B61L 27/16; B61L 27/40; B61L 27/50; B61L 23/00; B61L 27/04; B61L 15/0081; B61L 27/00; G07C 5/0808

See application file for complete search history.

(56) References Cited

U.S. PATENT DOCUMENTS

| | | | |
|---|---|---|---|
| 2019/0041845 A1* | 2/2019 | Cella | G05B 23/0291 |
| 2019/0129407 A1* | 5/2019 | Cella | H02M 1/12 |
| 2019/0344815 A1 | 11/2019 | Denny et al. | |
| 2020/0128029 A1* | 4/2020 | Nishimura | H04L 63/18 |

FOREIGN PATENT DOCUMENTS

| | | | | |
|---|---|---|---|---|
| CN | 108725520 A | | 11/2018 | |
| CN | 110329319 A | * | 10/2019 | .......... B61L 27/0038 |
| CN | 111210133 A | | 5/2020 | |
| EP | 3771615 A1 | * | 2/2021 | .......... B61L 15/0072 |
| WO | WO-2020013761 A1 | * | 1/2020 | |

\* cited by examiner

SYSTEM AND METHOD FOR COORDINATING OPERATION CONTROL AND OPERATION MAINTENANCE FOR URBAN RAIL TRANSIT

FIELD OF TECHNOLOGY

The present invention relates to the field of urban rail transits, and in particular, to a system and a method for coordinating operation control and operation maintenance for an urban rail transit.

BACKGROUND

An operation maintenance subsystem and an operation control subsystem for an urban rail transit are separately constructed, and respectively provide technical supports for rail transit maintenance personnel and dispatchers. There is only a limited maintenance data interface between two subsystems. The operation control system sends a part of maintenance data to the operation maintenance subsystem to support daily device maintenance works. Maintenance support subsystems are respectively disposed for signal, vehicle, power, and electromechanics, and maintenance information among the subsystems cannot be fully shared. When an operation device fails, the professional maintenance support subsystems cannot accurately position the fault, especially the cross-professional joint fault positioning, resulting in a long troubleshooting time. As a result, when the key operation device fails, the operation dispatching lacks technical support means for real-time understanding of information such as operation fault diagnosis and positioning, an impact range, and impact delay, so it is impossible to perform the operation dispatching adjustment decision-making scientifically and reasonably.

Chinese patent No. CN103888287A discloses an information system integrated operation and maintenance monitoring service early warning platform and an implementation method thereof. The platform includes: a data acquisition layer, configured to acquire basic data of a monitored device; a data processing layer, configured to process the basic data acquired by the data acquisition layer; a data display layer, configured to display the data after being processed by a user; and an information system integrated operation and maintenance monitoring service early warning platform management system, configured to manage the platform. The system runs through the three layers of the data acquisition layer, the data processing layer, and the data display layer, and performs uniform configuration and management on the three layers of the data acquisition layer, the data processing layer, and the data display layer. The present invention has refined, automatic, intelligent and integrated IT operation and maintenance monitoring functions, so that information technology operation and maintenance capabilities of large-scale enterprises are improved. However, the present invention is aimed at the information system integrated operation and maintenance monitoring service early warning platform in the field of IT system technologies, and does not involve the field of urban rail transit and operation control subsystem.

SUMMARY

The purpose of the present invention is to provide a system and a method for coordinating operation control and operation maintenance for an urban rail transit to overcome defects in the prior art.

The purpose of the present invention may be achieved through the following technical solutions.

A system for coordinating operation control and operation maintenance for urban rail transit system is provided, the system including: an intelligent operation maintenance subsystem and an intelligent operation control subsystem, where the intelligent operation maintenance subsystem and the intelligent operation control subsystem include coordination linkage engine modules respectively, and the intelligent operation maintenance subsystem synchronizes, by using the coordination linkage engine modules, a fault handling plan to the intelligent operation control subsystem.

Preferably, the system for coordinating operation control and operation maintenance further includes an isolation module, the intelligent operation maintenance subsystem is disposed in a signal maintenance network, the intelligent operation control subsystem is disposed in a signal safety network, and the signal maintenance network is isolated from the signal safety network by using the isolation module.

Preferably, the coordination linkage engine modules are based on a workflow mechanism and a data soft bus communication mechanism and are configured to implement efficient and reliable cooperation of an operation maintenance and operation control coordination plan.

Preferably, the intelligent operation maintenance subsystem is configured to acquire device operation states and fault information of an urban rail transit signal system, a vehicle system, a power system, and an electromechanical system, perform efficient fault diagnosis and accurate positioning according to a multi-discipline fault intelligent diagnosis method, and dynamically generate the fault handling plan according to a fault position, a severity level, a route state, and vehicle position information and send the fault handling plan to the intelligent operation control subsystem.

Preferably, the intelligent operation control subsystem is configured to be responsible for urban rail transit train operation plan, train operation command, train operation supervision and signal device supervision, receive the fault handling plan sent by the intelligent operation maintenance subsystem, and perform dispatching decision analysis to give an operation dispatching adjustment suggestion.

Preferably, the fault handling plan is a fault handling and dispatching auxiliary decision-making plan that is dynamically generated through comprehensive analysis according to the fault position, the fault severity level, a train operation position, and the route state.

Preferably, the intelligent operation maintenance subsystem further includes an acquiring module, a diagnosis module, and a plan analysis module, the acquiring module acquires the device operation states and the fault information of the signal system, the vehicle system, the power system, and an electromechanical key system; the diagnosis module performs diagnosis and accurate positioning on a fault according to an intelligent diagnosis method of cross-discipline multi-engine hybrid drive real-time diagnosis and analysis and fault root search and positioning; and the plan analysis module comprehensively analyzes a fault impact analysis range and an impact duration according to fault positioning information, the fault position and operation vehicle position information; and dynamically generates the fault handling plan.

Preferably, the intelligent operation control subsystem further includes a decision-making module, and the decision-making module performs dispatching decision analysis according to the fault handling plan, and quickly gives a dispatching adjustment suggestion.

A method using the system for coordinating operation control and operation maintenance for an urban rail transit is provided, the method including the following steps:

step 1: acquiring device operation states and fault information in a signal system, a vehicle system, a power system, and an electromechanical key discipline system, and establishing an urban rail transit holographic operation maintenance data center;

step 2: performing diagnosis and accurate positioning on a fault according to an intelligent diagnosis method of cross-discipline multi-engine hybrid drive real-time diagnosis and analysis and fault root search and positioning;

step 3: comprehensively analyzing a fault severity level, an impact analysis range, and an estimated repair duration according to fault positioning information, a fault position, a route state, and operation vehicle position information;

step 4: dynamically generating a fault handling plan according to comprehensively analyzed fault data, where content of the plan includes a fault rapid repair suggestion, an estimated repair time, and an estimated operation affecting time;

step 5: synchronizing, by an intelligent operation maintenance subsystem, the fault handling plan to an intelligent operation control subsystem by using coordination linkage engine modules;

step 6: receiving, by the intelligent operation control subsystem, the fault handling plan, performing dispatching decision analysis according to the plan, and giving an operation adjustment suggestion; and step 7: performing, by a driving dispatching terminal, rapid decision-making on an operation adjustment solution according to an actual situation, and determining whether the operation adjustment solution is performed according to the suggestion and the plan.

Compared with the prior art, the present invention has the following advantages:

1. In the present invention, multi-discipline integrated coordinative analysis and precise fault positioning of an urban rail transit are achieved, and the intelligent operation maintenance subsystem and the intelligent operation control subsystem are efficiently and safely coordinated based on a safety isolation module and by using coordination linkage engines, thereby greatly improving an intelligent decision-making level of urban rail transit operation and dispatching.

2. In the present invention, the coordinated linkage of operation maintenance and operation control systems is implemented, analysis of an impact of a device fault on the operation can be linked to the driving dispatching and commanding works, and according to the intelligent diagnosis positioning and impact analysis of the operation maintenance subsystem, the operation dynamic adjustment policy is automatically proposed to assist the operation dispatching decision-making, thereby greatly improving an emergency handling capability and efficiency of a line, and improving an intelligent level of operation and dispatching decision-making.

DESCRIPTION OF THE EMBODIMENTS

Clear and complete description will be made to the technical solutions in embodiments of the present invention in conjunction with drawings in the embodiments of the present invention hereafter. Obviously, the described embodiments are merely a part of embodiments of the present invention and not all the embodiments. Based on the embodiments of the present invention, all of other embodiments obtained by a person of ordinary skill in the art without any creative effort shall belong to the protection scope of the present invention.

Figure 1:
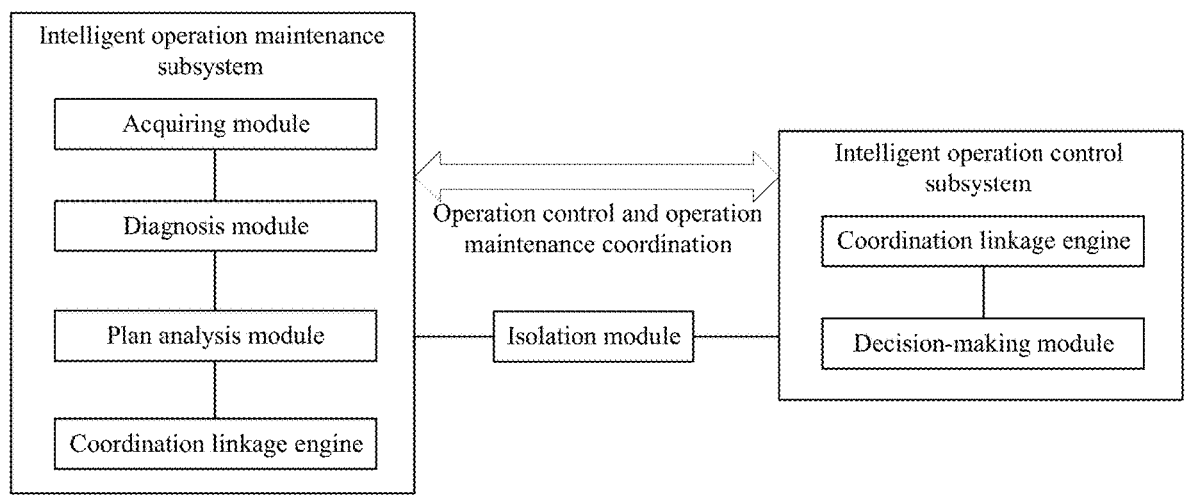
FIG. 1 is a schematic structural diagram of a system for coordinating operation maintenance and operation control of the present invention.

As shown in FIG. 1, a system for coordinating operation control and operation maintenance for an urban rail transit system is provided, the system including: an intelligent operation maintenance subsystem and an intelligent operation control subsystem, where the intelligent operation maintenance subsystem and the intelligent operation control subsystem include coordination linkage engine modules respectively, and the intelligent operation maintenance subsystem synchronizes, by using the coordination linkage engine modules, a fault handling plan to the intelligent operation control subsystem.

The system for coordinating operation control and operation maintenance further includes an isolation module, the intelligent operation maintenance subsystem is disposed in a signal maintenance network, the intelligent operation control subsystem is disposed in a signal safety network, and the signal maintenance network is isolated from the signal safety network by using the isolation module.

The coordination linkage engine modules are based on a workflow mechanism and a data soft bus communication mechanism and are configured to be responsible for implementing efficient and reliable cooperation of an operation maintenance and operation control coordination plan.

The intelligent operation maintenance subsystem is configured to acquire device operation states and fault information of an urban rail transit signal system, a vehicle system, a power system, and an electromechanical system, perform efficient fault diagnosis and accurate positioning according to a multi-discipline fault intelligent diagnosis method, and dynamically generate the fault handling plan according to a fault position, a severity level, a route state, and vehicle position information and send the fault handling plan to the intelligent operation control subsystem.

The multi-discipline fault intelligent diagnosis method is specifically: establishing a unified data acquisition and processing, internal cache, output and storage presentation method for multi-discipline heterogeneous systems such as signal, vehicle, and power; establishing an association relationship between different multi-discipline heterogeneous parameters and an alarming affecting manner based on analysis of parameter characteristics of the multi-discipline heterogeneous system; performing single fault diagnosis through a plurality of engine hybrid drive analysis such as waveform analysis, reasoning analysis, and fault tree analysis; and, gradually performing fault root search among multiple disciplines based on the established association relationship between the multi-discipline parameters and the alarming affecting manner, to implement accurate positioning of the fault root. The intelligent operation control subsystem is responsible for urban rail transit train operation plan, train operation command, train operation supervision and signal device supervision, receives the fault handling plan sent by the intelligent operation maintenance subsystem and performs dispatching decision analysis to give an operation dispatching adjustment suggestion, and provides a technical support for urban rail transit operation and driving dispatching and commanding.

The fault handling plan is a fault handling and dispatching auxiliary decision-making plan that is dynamically generated through comprehensive analysis according to the fault position, the fault severity level, a train operation position, and the route state.

The intelligent operation maintenance subsystem further includes an acquiring module, a diagnosis module, and a plan analysis module, the acquiring module acquires the device operation states and the fault information of the signal system, the vehicle system, the power system, and an electromechanical key system; the diagnosis module performs diagnosis and accurate positioning on a fault according to an intelligent diagnosis method of cross-discipline multi-engine hybrid drive real-time diagnosis and analysis and fault root search and positioning; and the plan analysis module comprehensively analyzes a fault impact analysis range and an impact duration according to fault positioning information, the fault position and operation vehicle position information; and dynamically generates the fault handling plan.

Preferably, the intelligent operation control subsystem further includes a decision-making module, and the decision-making module performs dispatching decision analysis according to the fault handling plan, and quickly gives a dispatching adjustment suggestion.

It should be noted that, in the embodiments of the present invention, related functional modules may be implemented by using a hardware processor.

Figure 2:
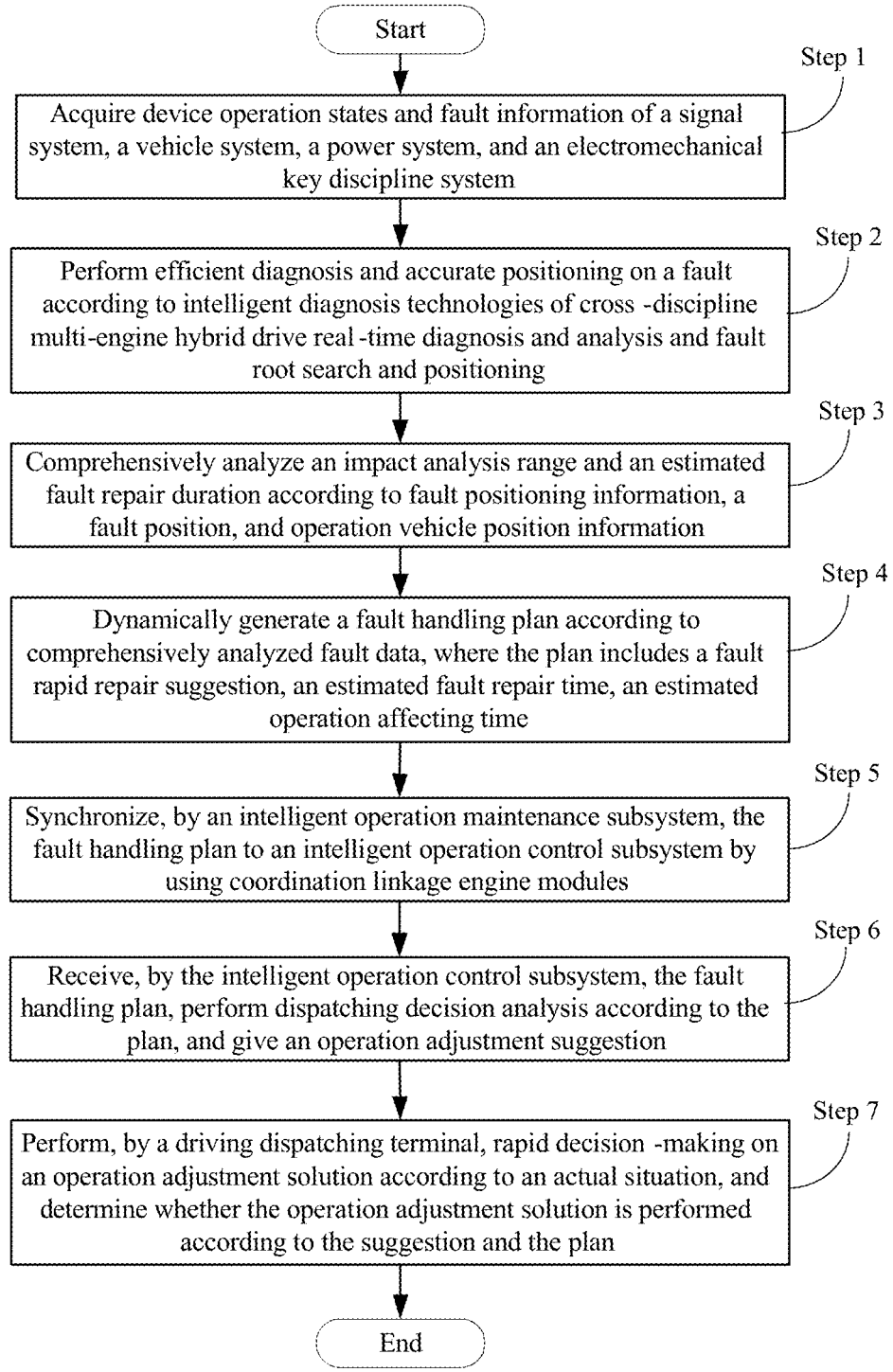
FIG. 2 is a flowchart of a method of the present invention.

As shown in FIG. 2, a method using for coordinating operation control and operation maintenance for an urban rail transit is provided, the method including the following steps:

step 1: acquiring device operation states and fault information in a signal system, a vehicle system, a power system, and an electromechanical key discipline system, and establishing an urban rail transit holographic operation maintenance data center;

step 2: performing diagnosis and accurate positioning on a fault according to an intelligent diagnosis method of cross-discipline multi-engine hybrid drive real-time diagnosis and analysis and fault root search and positioning;

step 3: comprehensively analyzing a fault severity level, an impact analysis range, and an estimated repair duration according to fault positioning information, a fault position, a route state, and operation vehicle position information;

step 4: dynamically generating a fault handling plan according to comprehensively analyzed fault data, where content of the plan includes a fault rapid repair suggestion, an estimated repair time, and an estimated operation affecting time;

step 5: synchronizing, by an intelligent operation maintenance subsystem, the fault handling plan to an intelligent operation control subsystem by using coordination linkage engine modules;

step 6: receiving, by the intelligent operation control subsystem, the fault handling plan, performing dispatching decision analysis according to the plan, and giving an operation adjustment suggestion; and step 7: performing, by a driving dispatching terminal, rapid decision-making on an operation adjustment solution according to an actual situation, and determining whether the operation adjustment solution is performed according to the suggestion and the plan.

In the present invention, multi-discipline integrated coordinative analysis and precise fault positioning of an urban rail transit are achieved, and the intelligent operation maintenance subsystem and the intelligent operation control subsystem are efficiently and safely coordinated based on a safety isolation module and by using coordination linkage engines, thereby greatly improving an intelligent decision-making level of urban rail transit operation and dispatching.

The above descriptions are only specific implementations of the present invention. However, the protection scope of the present invention is not limited thereto, any person skilled in the art can easily think of various equivalent modifications or substitutions within the technical scope disclosed by the present invention, and all of these modifications or substitutions shall fall within the protection scope of the present invention. Therefore, the protection scope of the present invention should be determined with reference to the appended claims.

What is claimed is:

1. A system for coordinating operation control and operation maintenance for an urban rail transit, the system comprising: an intelligent operation maintenance subsystem and an intelligent operation control subsystem, wherein the intelligent operation maintenance subsystem and the intelligent operation control subsystem comprise coordination linkage engine modules respectively, and the intelligent operation maintenance subsystem synchronizes, by using the coordination linkage engine modules, a fault handling plan to the intelligent operation control subsystem, wherein the intelligent operation maintenance subsystem is configured to acquire device operation states and fault information of an urban rail transit signal system, a vehicle system, a power system, and an electromechanical system, perform fault diagnosis and positioning according to a multi-discipline fault intelligent diagnosis method, and dynamically generate the fault handling plan according to a fault position, a severity level, a route state, and vehicle position information and send the fault handling plan to the intelligent operation control subsystem, wherein the intelligent operation maintenance subsystem further comprises an acquiring module, a diagnosis module, and a plan analysis module, the acquiring module acquires the device operation states and the fault information of the signal system, the vehicle system, the power system, and an electromechanical discipline key system; the diagnosis module performs diagnosis and positioning on a fault according to an intelligent diagnosis method of cross-discipline multi-engine hybrid drive real-time diagnosis and analysis and fault root search and positioning; and the plan analysis module comprehensively analyzes a fault impact analysis range and an impact duration according to fault positioning information, the fault position and operation vehicle position information; and dynamically generates the fault handling plan.

2. The system for coordinating operation control and operation maintenance for an urban rail transit according to claim 1, wherein the system further comprises an isolation module, the intelligent operation maintenance subsystem is disposed in a signal maintenance network, the intelligent operation control subsystem is disposed in a signal safety network, and the signal maintenance network is isolated from the signal safety network by using the isolation module.

3. The system for coordinating operation control and operation maintenance for an urban rail transit according to claim 1, wherein the coordination linkage engine modules are based on a workflow mechanism and a data soft bus communication mechanism and are configured to implement cooperation of an operation and maintenance and operation control coordination plan.

4. The system for coordinating operation control and operation maintenance for an urban rail transit according to claim 1, wherein the intelligent operation control subsystem is configured to be responsible for an urban rail transit train operation plan, train operation command, train operation supervision and signal device supervision, receive the fault handling plan sent by the intelligent operation maintenance subsystem, and perform dispatching decision analysis to give an operation dispatching adjustment suggestion.

5. The system for coordinating operation control and operation maintenance for an urban rail transit according to claim 4, wherein the intelligent operation control subsystem further comprises a decision-making module, and the decision-making module performs dispatching decision analysis according to the fault handling plan, and gives a dispatching adjustment suggestion.

6. The system for coordinating operation control and operation maintenance for an urban rail transit according to claim 1, wherein the fault handling plan is a fault handling and dispatching auxiliary decision-making plan that is dynamically generated through comprehensive analysis according to the fault position, the fault severity level, a train operation position, and the route state.

7. A method using a system for coordinating operation control and operation maintenance for an urban rail transit, the system comprising: an intelligent operation maintenance subsystem and an intelligent operation control subsystem, wherein the intelligent operation maintenance subsystem and the intelligent operation control subsystem comprise coordination linkage engine modules respectively, and the intelligent operation maintenance subsystem synchronizes, by using the coordination linkage engine modules, a fault handling plan to the intelligent operation control subsystem, the method comprising the following steps:

step 1: acquiring device operation states and fault information of a signal system, a vehicle system, a power system, and an electromechanical key discipline system, and establishing an urban rail transit holographic operation maintenance data center;

step 2: performing diagnosis and positioning on a fault according to an intelligent diagnosis method of cross-discipline multi-engine hybrid drive real-time diagnosis and analysis and fault root search and positioning;

step 3: comprehensively analyzing a fault severity level, an impact analysis range, and an estimated repair duration according to fault positioning information, a fault position, a route state, and operation vehicle position information;

step 4: dynamically generating a fault handling plan according to comprehensively analyzed fault data, wherein content of the fault handling plan comprises a fault repair suggestion, an estimated repair time, and an estimated operation affected time;

step 5: synchronizing, by an intelligent operation maintenance subsystem, the fault handling plan to an intelligent operation control subsystem by using coordination linkage engine modules;

step 6: receiving, by the intelligent operation control subsystem, the fault handling plan, performing dispatching decision analysis according to the fault handling plan, and giving an operation adjustment suggestion; and step 7: performing, by a driving dispatching terminal, decision-making on an operation adjustment solution according to an actual situation, and determining whether the operation adjustment solution is performed according to the operation adjustment suggestion and the fault handling plan.

\* \* \* \* \*